May 20, 1930.  S. S. MATTHES  1,759,704
CONDUCTOR SUPPORT
Filed Oct. 25, 1924
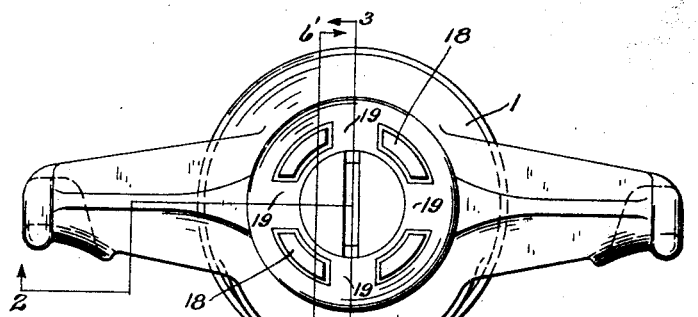
Fig. 1.
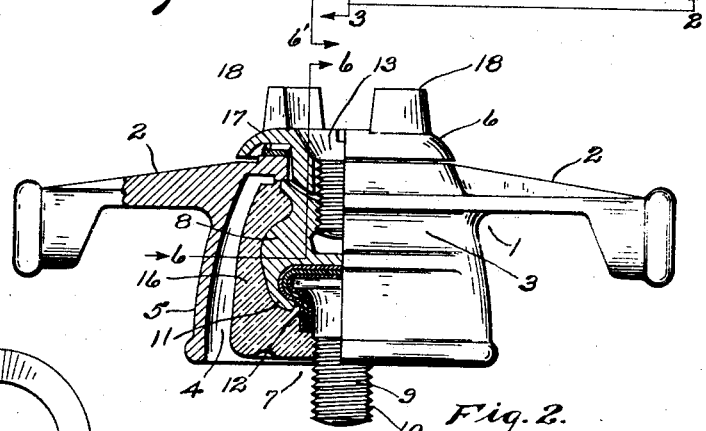
Fig. 2.
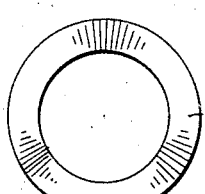
Fig. 4.
Fig. 5.
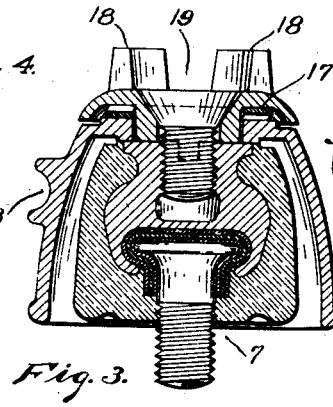
Fig. 3.
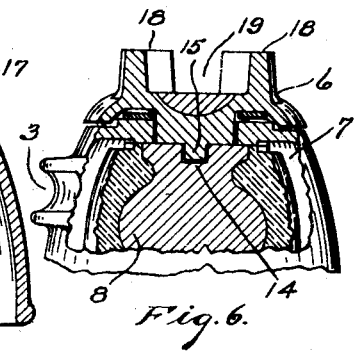
Fig. 6.
Witness:
H. J. Stromberger
Inventor
SAMUEL S. MATTHES.
By
Attorney Patented May 20, 1930

1,759,704

UNITED STATES PATENT OFFICE

SAMUEL S. MATTHES, OF MANSFIELD, OHIO, ASSIGNOR TO THE OHIO BRASS COMPANY, OF MANSFIELD, OHIO, A CORPORATION OF NEW JERSEY

CONDUCTOR SUPPORT

Application filed October 25, 1924. Serial No. 745,818.

My invention relates to supports for conductors and has particular reference to that class of support by means of which a trolley conductor is secured to an overhead hanger and in insulated relation thereto.

The object of my invention is to provide a device which has a long leakage path over an insulated surface, and which surface is protected from the rain and weather and in which the supporting ear or clamp, which is secured to the device and clamped to the trolley wire, will have unlimited rotation relatively to the support and in which the rotation of the insulated member to which the trolley ear or clamp is secured is retarded but not prevented.

Another object of my invention is to permit the device if installed upon a support to be secured to or removed from a conductor clamp or ear without disturbing the connection of either the device or the clamp or ear with their respective supports or conductors, or without disturbing both.

My invention resides in the new and novel construction, combination and relation of the various elements hereinafter more fully described and disclosed in the drawing and set forth in the claims:

In the drawing:

Fig. 1 is a top view of my invention.

Fig. 2 is a partial sectional view and side elevation of my invention, as shown in Fig. 1, and taken along the sectional line 2—2 of Fig. 1.

Fig. 3 is a sectional view of Fig. 1 on the line 3—3.

Figs. 4 and 5 are plan and edge views respectively of a spring washer which I employ and later describe.

Fig. 6 is a partial sectional view of Figs. 1 and 2 taken on the lines 6—6 of Figs. 1 and 2.

In the preferred embodiment of my invention I employ a body member 1 provided with arms 2 to secure the device to a cross-span wire. Cooperating with the cross-span wire is a groove 3 in which the span wire rests, tending to better hold the supporting device in place upon the span wire. The body member 1 is provided with an inverted cup-shaped recess 4 formed by the inverted cup 5 and provided at its upper end with an opening to receive the adjusting cap 6.

Mounted within the recess 4 is an insulated rotatable member 7 which comprises a member 8 to which is secured a supporting stud 9 provided with threads 10. The supporting stud 9 is secured within a cup-shaped recess in the member 8 by means of the overturned lips 11 clamping the supporting member 9 in place with the intervening insulation 12, which may be of built-up mica or other suitable insulation. The member 8 is provided at its upper end with a threaded recess to receive a screw or other fastening device 13 for uniting the members 6 and 7 together. The members 6 and 7 are prevented from rotation relative to each other by means of diametrically oppositely disposed slots 14 in the member 8 and projecting lugs 15 on the cap 6 cooperating with the slots 14. The members 8 and 9 after being properly united through the medium of the bent lips 11 and insulated from each other are provided with an exterior coating 16 of molded composition, thereby giving a long exterior leakage path over the surface of the insulator from the stud 9 to the member 8. Interposed between the cap 6 and the body member 1 is a crimped or corrugated spring washer 17 which offers a yielding resistance to the rotation of the insulating member 7 relative to the body member 1. The rotative resistance of the washer 17 may be varied by varying the degree with which the members 6 and 8 are brought together by means of the screw 13.

This spring washer 17 prevents the free rotation of the insulating member 7 and the body member 1 and also offers some yielding action in a downward direction of the insulating member relative to the body member 1, and this yielding action can, of course, be materially varied by varying the type of washer and the size of same and, in fact, a helical spring may be substituted for the washer 17 which is shown by properly arranging the parts 1 and 6 to receive such spring.

The cap member 6 is provided with two or more upstanding lugs 18 which form the slots 19 which may be used as a means for rotating the member 7 into engagement with a trolley clamp or ear.

Having the five parts herein described, my device is assembled by inserting the member 7 within the body member 1, then positioning the member 17 in place and then positioning the member 6, as shown, and these parts are then held in the position described by means of the screw 13 which, by proper manipulation, may be made to vary the tension between the rotatable member 7 and the body member 1 and hold the parts in assembled relation with the members 6 and 7 interlocked for simultaneous rotation relative to the body 1.

In installing my device in actual use, the device is first applied to a cross-span wire by any suitable means, as such an operation is old with respect to devices similar to my device. The trolly ear or clamp, which is always provided with a threaded boss, is positioned upon the supporting stud 9 and in order to tighten the ear or clamp upon the insulating member 7 the ear or clamp is held and a wrench or bar applied to the lugs 18 and which is then rotated, and this will tend to rotate the member 7 into proper engagement with the ear or clamp. The effort required to rerotate the member 7 relative to the ear or clamp will usually be very much greater than that required to rotate the insulating member relative to the body member 1, therefore, the tendency for the ear and member 7 to rotate relative to each other is remote, as any rotatable stress upon the ear will rotate the member 7 in unison therewith. If the ear or clamp cannot be rotated upon the stud 9 due to its first being applied to the trolley wire, then the stud 9 may be brought into cooperative relation with the boss on the ear and the member 7 rotated by application of a proper tool to the cap member 6.

It will be readily understood that I have produced a hanger in which the surface insulation between the trolley and ground has been made maximum, depending upon the size of the device and the surface has been protected by the cup-shaped member 5. Also, that the insulating member is rotatable relative to the body member and can therefore, be applied to or removed from a trolley ear which cannot be rotated in order to assemble or disassemble the device and ear. It will also be apparent that after the device has been fully installed that any tendency for the device to rotate relative to the trolley wire will be permitted without the tendency for the ear to loosen from its support, as the member 7 is comparatively free to rotate relative to the body 1. It will also be apparent that the tension between the body member 1 and the rotating member 7 may be varied or adjusted, and that the spring washer 17 offers a vertical yielding action of the insulated member relative to the body member and although this is slight, as shown in the specific construction, still it is sufficient to relieve the parts of undue shock under some circumstances.

There are modifications which will be readily apparent to those skilled in the art, but I do not wish to be limited otherwise than by my claims.

I claim:

1. A supporting device comprising a supporting member, a suspension member comprising two insulated parts secured thereto in rotatable relation and detachable means interlocked with the suspension member against relative rotation and supported by the supporting member and rotatable, detachable means to secure the first said means and the suspension member together and adjust the first said detachable means along the longitudinal axis of the suspension member.

2. A conductor support comprising a supporting member, a two-part suspending member having its parts insulated from each other and having unlimited rotation relative to the supporting member, means interlocked with one member against relative rotation and secured to the other member and other means to secure the said means and the suspending member together.

3. A supporting device comprising a supporting member having an inverted-cup-shaped portion and arms to engage a supporting structure, a two-part suspending member having the two parts insulated from each other and permanently interlocked against separation and one part insulated from the supporting member, the suspending member mounted within the cup-shaped portion and having its side walls spaced therefrom to form an air space, a plurality of means to secure the supporting and suspending members together in rotatable relation and one of said means detachably securing another of said means and the suspending member together.

4. A supporting device comprising a supporting member having an inverted-cup-shaped portion and arms to engage a supporting structure, a two-part suspending member having its parts insulated and permanently interlocked against separation, the suspending member mounted within the cup-shaped portion with its side walls spaced therefrom to form an air space, a plurality of means to secure the suspending member and the supporting member together in rotatable relation, a yielding member interposed between one of the said means and the supporting member and one of said means arranged to adjust the tension of the yielding member relative to the engaged parts.

5. A conductor support comprising a supporting member having an inverted cup-shaped wall, a two part suspension member having one part insulated from and both parts having unlimited rotation relative to the supporting member, a pair of detachable members to secure the suspending member to the supporting member, one of said detachable members interlocked with said suspension member to rotate with the suspension member, the other detachable member holding the first said detachable member and the suspending member together and the side walls of the supporting and the suspending members forming a space therebetween.

6. A conductor support comprising a supporting member, a two part suspending member having one part insulated from and both parts having unlimited rotation relative to the supporting member, means to yieldingly resist the relative rotation of the members, a pair of detachable members to secure the said relatively rotatable members together, one detachable member interlocked with the suspension member to rotate simultaneously therewith and the other detachable member holding the said elements in said relative relation.

7. A conductor support comprising a supporting member, a two part suspending member having its parts insulated from each other and having unlimited rotation relative to the supporting member, means detachably secured to the suspension member and interlocked therewith against relative rotation to secure the members together.

8. A supporting device comprising a body member, a two part suspension member having one part insulated from and both parts rotatable relative to the body member, means supported by the body member and interlocked with and rotatable with the suspension member and means detachably securing the first said means and the suspension member together.

9. A supporting device comprising a body member, a two part suspension member having one part insulated from and both parts rotatable relative to the body member, means interlocked with the suspension member and rotatable therewith and engaging with the body in relative rotation thereto, means to hold the first said means and the suspension member together and means to rotate the first said means at will.

In testimony whereof I affix my signature.

SAMUEL S. MATTHES.